United States Patent
Kneckt (10) Patent No.: US 9,531,606 B2
(45) Date of Patent: Dec. 27, 2016

(54) PACKET MEASUREMENTS AND REPORTING IN WIRELESS NETWORK

(71) Applicant: NOKIA CORPORATION, Espoo (FI)

(72) Inventor: Jarkko Lauri Sakari Kneckt, Espoo (FI)

(73) Assignee: Nokia Technologies Oy, Espoo (FI)

( * ) Notice: Subject to any disclaimer, the term of this patent is extended or adjusted under 35 U.S.C. 154(b) by 98 days.

(21) Appl. No.: 14/442,741

(22) PCT Filed: Dec. 7, 2012

(86) PCT No.: PCT/FI2012/051212
§ 371 (c)(1),
(2) Date: May 14, 2015

(87) PCT Pub. No.: WO2014/087042
PCT Pub. Date: Jun. 12, 2014

(65) Prior Publication Data
US 2015/0295797 A1   Oct. 15, 2015

(51) Int. Cl.
*H04L 12/26* (2006.01)
*H04W 52/02* (2009.01)
*H04W 56/00* (2009.01)

(52) U.S. Cl.
CPC ......... *H04L 43/062* (2013.01); *H04L 43/106* (2013.01); *H04W 52/0225* (2013.01); *H04W 56/0045* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2006/0083168 A1* | 4/2006 | Prakash | H04L 1/205 370/230 |
| 2007/0064655 A1 | 3/2007 | Ruuska | |
| 2009/0010194 A1 | 1/2009 | Seok et al. | |
| 2010/0309798 A1* | 12/2010 | Fodor | H04W 52/06 370/252 |
| 2013/0301500 A1* | 11/2013 | Koc | H04W 76/048 370/311 |
| 2014/0153460 A1* | 6/2014 | Shrivastava | H04W 52/0225 370/311 |

FOREIGN PATENT DOCUMENTS

| | | |
|---|---|---|
| EP | 1311086 A2 | 5/2003 |
| WO | 2005011132 A2 | 2/2005 |
| WO | 2008033438 A2 | 3/2008 |

OTHER PUBLICATIONS

International Search Report of PCT/FI2012/051212 dated Sep. 2, 2013.

* cited by examiner

*Primary Examiner* — Hassan Phillips
*Assistant Examiner* — Duc Duong
(74) *Attorney, Agent, or Firm* — Banner & Witcoff, Ltd.

(57) ABSTRACT

This document discloses methods, apparatuses, and computer programs for carrying out packet arrival measurements and reporting the measurement results. A first wireless apparatus transmits a packet arrival measurement request to a second wireless apparatus. The first wireless apparatus then receives a packet arrival measurement report from the second wireless apparatus, wherein the packet arrival measurement report comprises information on arrival of at least one data packet addressed to the first wireless apparatus at the second wireless apparatus.

22 Claims, 5 Drawing Sheets

PACKET MEASUREMENTS AND REPORTING IN WIRELESS NETWORK

FIELD

The invention relates to the field of wireless communications and, particularly to measuring packet arrivals and reporting the measurements in a wireless network.

BACKGROUND

Various measurements are carried out in devices of a wireless network, including channel measurements and transmission error measurements. The measurements may be used to improve the performance of the wireless network and the devices of the wireless network. Some measurements may be reported between the devices of the wireless network.

BRIEF DESCRIPTION

The invention is defined by the independent claims.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
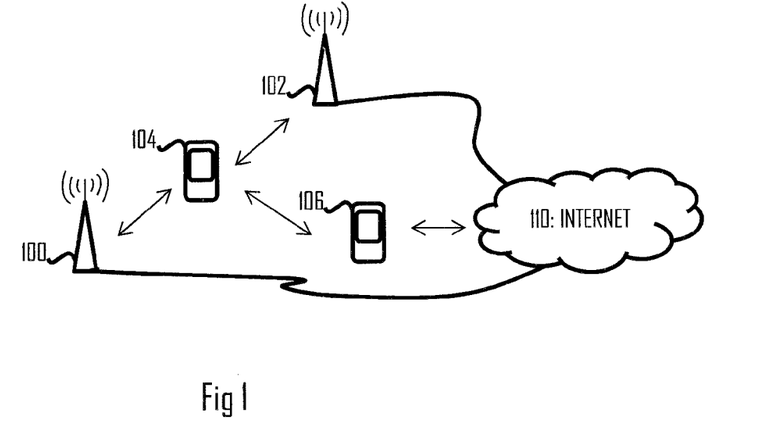
FIG. 1 illustrates an example of a wireless communication to which embodiments of the invention may be applied.

A general wireless communication scenario to which embodiments of the invention may be applied is illustrated in FIG. 1. FIG. 1 illustrates wireless communication devices comprising access points (AP) 100 and a plurality of terminal devices (STA) 104, 106. The Aps 100, 102 may be stationary access points. A general term used in this specification and encompassing both the APs and STAs is a wireless apparatus. At least one of the terminal devices 106 may have a functionality of an AP as well. Therefore, a common term encompassing both the stationary APs 100, 102 and mobile APs 106 is an access node. An access node 100, 102, 106 may be associated with a basic service set (BSS) which is a basic building block of an IEEE 802.11 wireless local area network (WLAN). Each access node 100, 102, 106 may represent a different BSS. The most common BSS type is an infrastructure BSS that includes a single access node together with all STAs associated with the AP. The access node may provide access to other networks, e.g. the Internet 110. In another embodiment, the BSSs may be connected with each other by a distribution system (DS) to form an extended service set (ESS). An independent BSS (IBSS) is formed by an ad hoc network of terminal devices without a stationary controlling access point. While embodiments of the invention are described in the context of the above-described topologies of IEEE 802.11, it should be appreciated that these or other embodiments of the invention may be applicable to networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptiveness to coexist with radio access networks based on different specifications and/or standards. Some embodiments may be applicable to networks having features under development by other IEEE task groups, e.g. 802.19 task group 1 (TG1).

The different access nodes 100, 102, 106 may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP.

As described above, the BSS may be represented by the access node and one or more terminal devices connected to the access node. A terminal device 102 to 114 may establish a connection with any one of the access nodes it has detected to provide a wireless connection within the neighbourhood of the terminal device. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

Embodiments described herein are applicable also to a multipath scenario in which a terminal device 104 operates a plurality of concurrent associations to different access nodes 100, 102, 106. The terminal device 104 may utilize the multipath scenario to provide a multipath connection to a network server via multiple different access nodes. Such a multipath connection is supported on higher protocol layers, e.g. by a multipath real time protocol, multipath transport control protocol (TCP) and multipath universal datagram protocol (UDP) defined within Internet Engineering Task Force (IETF). IEEE 802.11 (WLAN/Wi-Fi) radio is one of the main candidate radios to be used with the multi path protocols.

The WLAN radio may be enabled to associate/establish links with many access nodes. Use of multiple links is advantageous, if the associated access nodes are capable of transmitting traffic efficiently over the air interface but backbone links of the access nodes used to connect the access nodes to the Internet have a low throughput, e.g. an ADSL (asynchronous digital subscriber line) modem. In these cases, operating with multiple APs may increase the total throughput experienced by the terminal device.

When the terminal device is in an active mode with an access node, the access node may transmit data packets to the terminal device as soon as they are received at the access node. The TXOP obtaining (CSMA/CA) may cause a random access delay. The access node may also cause some delay when preparing the packets to an appropriate transmission format, e.g. when performing frame aggregation to minimize the used air transmission time and reduce signalling overhead. For a terminal device in a power save mode, the access node may not be able to transmit the data packets to the terminal device without an additional delay caused by hibernation of the terminal device. The access node may set the packets to a sleep buffer and deliver them to the terminal device during a service period triggered by the terminal device when it powers up after the hibernation.

With respect to the definition of the power-save mode, a terminal device operating in the power-save mode may be considered as hibernating or dozing. For example, the terminal device in the power-save mode may have shut down at least some of its transceiver circuitries. According to another point of view, the terminal device is not able to communicate with the access node in the power-save mode. When the terminal device awakes from the power-save mode, it powers up its transceiver circuitries and is able to communicate with the access node. The terminal device may employ the power-save mode to reduce its functions, to reduce power consumption, and to prolong battery lifetime.

When the terminal device uses a multipath protocol with access nodes having different operating channels, the terminal device may operate on a single channel at a time, when not hibernating, so it may be considered to hibernate or, in other words, operate in a power save mode towards the other access nodes. The terminal device that operates in the power save mode lacks visibility to the packet arrival times at the access node, because it cannot determine a duration the packets have been stored in a transmission buffer of the access node. An embodiment comprises a method to provide the terminal device with measurement information on packet arrivals of data packets addressed to the terminal device at one or more access nodes with which the terminal device has established a connection. On the basis of this measurement information, the terminal device may select power save parameters that comply with the packet arrivals at the access node.

In the context of this description, the data packet may refer to at least some of the following: a payload data packet, a management packet, a medium access control (MAC) management protocol data unit (MMPDU), a MAC service data unit, a physical layer convergence protocol (PLOP) protocol data unit, or a PLOP service data unit.

Figure 2A:
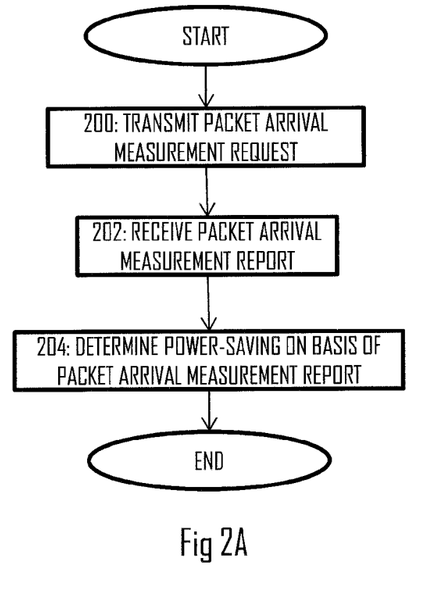
FIGS. 2A and 2B illustrate flow diagrams of processes for providing packet arrival measurement according to some embodiments of the invention.
Figure 2B:
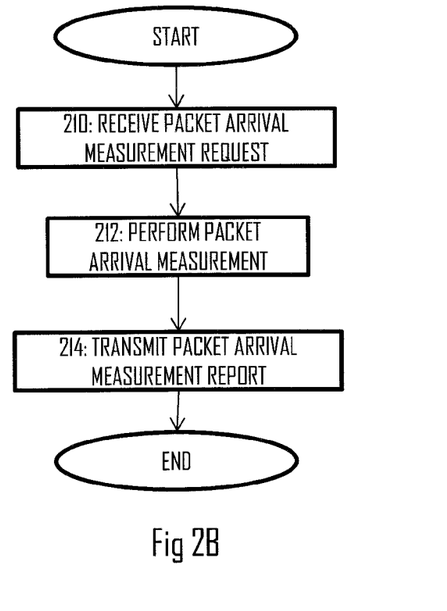

FIGS. 2A and 2B illustrate embodiments of such a method. The method of FIG. 2A illustrates a flow diagram of the method from the viewpoint of the terminal device, while the method of FIG. 2B illustrates a flow diagram of the method from the viewpoint of the access node. However, it should be appreciated that the concept of this embodiment may be realized in networks where there are no specific terminal devices or access nodes. Therefore, the description of this embodiment encompasses communication between two wireless apparatuses. The respective methods may be carried out as computer processes in the respective apparatuses, each apparatus comprising at least one processor and at least one memory including a computer program code, wherein the at least one memory and the computer program code are configured, with the at least one processor, to cause the apparatus to carry out the respective method.

Referring to FIG. 2A, a first wireless apparatus causes transmission of a packet arrival measurement request to a second wireless apparatus in block 200. In block 202, the first wireless apparatus receives a packet arrival measurement report from the second wireless apparatus. The packet arrival measurement report comprises information on arrival of at least one data packet addressed to the first wireless apparatus at the second wireless apparatus. In block 204, the first wireless apparatus determines a timing of triggering a data transfer between the wireless apparatuses on the basis of the packet arrival measurement report. The data transfer may be downlink data transfer from the second wireless apparatus to the first wireless apparatus but, in some embodiments, it may comprise uplink data transfer from the first wireless apparatus to the second wireless apparatus.

In an embodiment, the first wireless apparatus determines at least one power-save parameter on the basis of the packet arrival measurement report. The at least one power-save parameter may comprise timing of operating in the power-save mode, e.g. start time, end time and/or duration of the power-save mode. In an embodiment, the timing of triggering data transfer comprises a timing of triggering the first wireless apparatus to awake from a power save mode. The timing may be a timing at which the first wireless apparatus transits from the power-save mode to an active mode by powering up its transceiver circuitries. The timing may be a timing when the first wireless apparatus has already powered up and starts to attempt transmission of a triggering frame, polling frame, or any other frame that triggers the data transfer. The timing may be the timing when the first wireless apparatus actually transmits such a frame.

Referring to FIG. 2B, the second wireless apparatus receives the packet arrival measurement request from the first wireless apparatus in block 210. In block 212, the second wireless apparatus measures information on arrival of at least one data packet addressed to the first wireless apparatus at the second wireless apparatus. It should be appreciated that the execution of block 212 may be continuous in the sense that it may be carried out before block 210, in parallel with block 210 and/or after block 210. In block 214, the second wireless apparatus causes transmission of the packet arrival measurement report to the first wireless apparatus.

The measurement information on the packet arrivals at the second wireless apparatus enables the terminal device to plan the power-save parameters such that they match with the packet arrivals. Accordingly, the hibernation of the first wireless apparatus may be adapted to the packet arrivals such that buffering delays etc. may be reduced.

In an embodiment, the information on the packet arrivals comprises information on packet arrival rate of data packets addressed to the first wireless apparatus at the second wireless apparatus.

Figure 3:
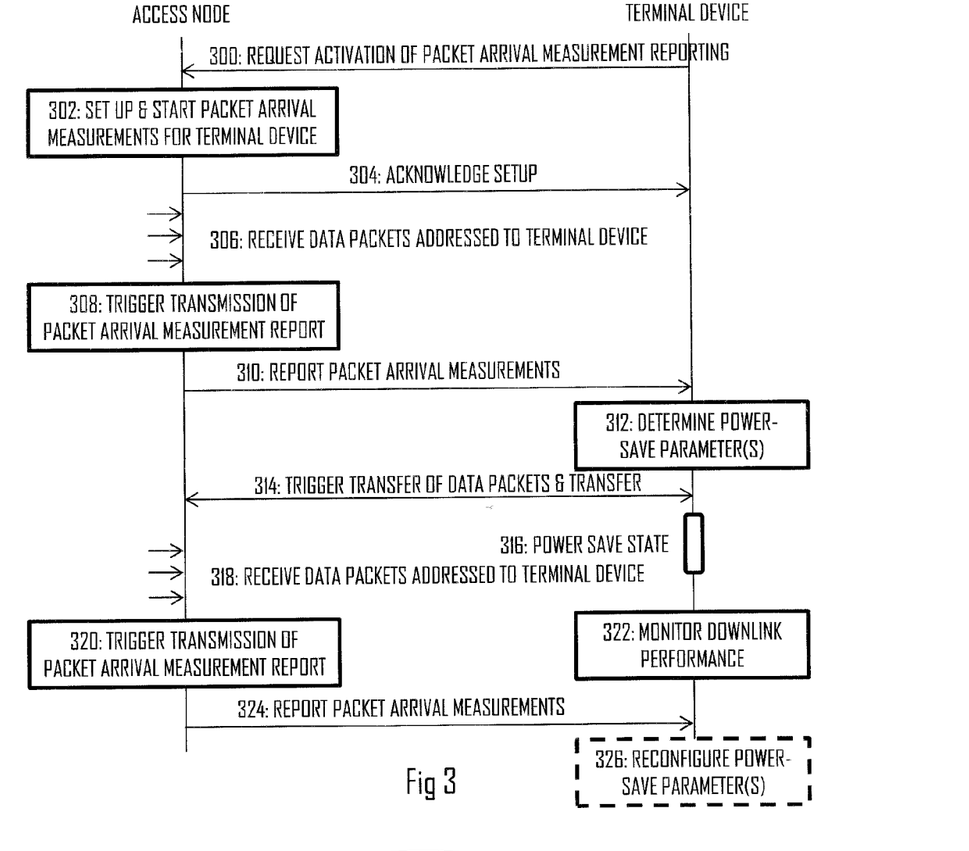
FIG. 3 illustrates a signalling diagram of a procedure for activating packet arrival measurements for a terminal device and carrying out packet arrival measurement and reporting according to an embodiment of the invention.

Let us now consider an embodiment of a detailed procedure for providing the packet arrival measurement reports with reference to FIG. 3. The embodiment of FIG. 3 illustrates the embodiment in the context where a terminal device is connected to an access node, but it should be appreciated that the terminal device and the access node may be arbitrary wireless devices.

Referring to FIG. 3, let us assume an initial situation where the terminal device and the access node have established or are establishing a connection with each other. In step 300, the terminal device requests for activation of packet arrival measurement reporting. The request may be transmitted from the terminal device to the access node at the beginning of the connection or during the operation of the connection, e.g. after some data frames have already been transmitted between the terminal device and the access node. Table 1 below shows an embodiment of information elements that may be comprised in a packet arrival measurement request frame transmitted by the terminal device in step 300.

TABLE 1

| Type | Length | Arrival Measurement Options | AC Selection | Arrival Report Interval |
|---|---|---|---|---|
| 1 octet | 1 octet | 1 octet | 1 octet | 0-1 octet |

Information element "Type" is set to unique value that indicates the frame type, i.e. the packet arrival measurement request frame. Information element "Length" defines the length of the frame payload in octets, and it may be set to 2 or 3 in this embodiment. Information element "Arrival Measurement Options" may comprise at least some of the fields illustrated in Table 2:

TABLE 2

| Multipath Capable | Multipath in Use | Arrival Measurement Reporting Options | Arrival Times Reported | Recommendations present | Reserved |
|---|---|---|---|---|---|
| 1 bit | 1 bit | 2 bits | 1 bit | 1 bit | 2 bits |

Field "Multipath Capable" may be set to one value (e.g. "1") to indicate that the terminal device is capable of operating with multipath protocols, e.g. multipath TCP, multipath RTS, and/or multipath UDP, and set to the other value (e.g. "0") otherwise. When the terminal device is capable of operating with the multipath protocols, the access node may assume link maintenance that is different from that applied to terminal devices not supporting the multipath protocols.

Field "Multipath in Use" may be set to one value (e.g. "1") to indicate that the terminal device is currently using a multipath protocol and that the access node is one of the access nodes to which the multipath protocol data is transmitted. Otherwise, the field may be set to the other value (e.g. "0").

Field "Arrival Measurement Reporting Options" comprises transmission control timing information configuring the transmission of the packet arrival measurement reports. Table 3 below shows an embodiment of the different transmission configurations defined by this field.

TABLE 3

| Value | Description |
|---|---|
| 00 | Report on Request |
| 01 | Report during every service period |
| 10 | Report at prescribed time intervals |
| 11 | Reserved |

Value "00" instructs the access node to transmit the packet arrival measurement report only upon request received from the terminal device. The terminal device may transmit a report transmission request message as a dedicated management frame, e.g. a medium access control (MAC) management action frame, or the request may be comprised in a MAC header of another frame. The MAC header may comprise a dedicated field for the report transmission request. Value "01" instructs the access node to transmit the packet arrival measurement report during every service period. A service period is a period during which the access node transmits at least one data packet to the terminal device. In the context of WLAN, the service period may be triggered by the terminal device that activates itself after being in the power-save mode and detects that the access node has data packet(s) to be transmitted to the terminal device. The detection may be based on reception of a beacon frame or another frame from the access node, wherein the frame carries a traffic indication map (TIM) indicating whether or not the access node has buffered data packets for the terminal device. Upon detecting that the access node has buffered at least one data packet for the terminal device, the terminal device may transmit a triggering frame to the access node, thus triggering the start of the service period. The service period may end after transmission of at least one data frame and the packet arrival measurement report. Multiple data frames may be transmitted during the service period as well.

Value "10" instructs the access node to transmit the packet arrival measurement report at time intervals specified by the terminal device. The terminal device may use "Arrival Report Interval" information element of Table 1 to specify the timing. The "Arrival Report Interval" may be an unsigned integer and indicate a packet arrival report frame transmission periodicity in units of a time unit, e.g. 1.024 milliseconds (ms). It may optionally specify an offset of the transmission timing of the packet arrival measurement report. A reference for the offset may be a target beacon transmission time (TBTT) of the access node, for example.

The "Arrival Measurement Options" field may be comprised in the packet arrival measurement request frame, as described above, in an association request frame, and/or in frames transmitted by the access node, e.g. a packet arrival measurement response frame, a beacon frame, a probe response frame, and/or an association response frame.

Information element "Access Category (AC) Selection" may indicate for each AC whether or not that AC shall be taken into account in the packet arrival measurement report. The information element may comprise a separate bit or bit combination for each AC, e.g. voice, video, best effort, and background as:

TABLE 4

| AC_VO | AC_VI | AC_BE | AC_BK | Reserved |
| --- | --- | --- | --- | --- |
| 1 bit | 1 bit | 1 bit | 1 bit | 4 bits |

Accordingly, the access node may be configured to report the packet arrival measurements according to the AC, e.g. for each AC separately or by preparing an aggregate report considering the ACs requested by the terminal device.

In another embodiment, the terminal device may configure the access node to carry out the reporting by using other traffic classification. For example, the terminal device may configure the access node to consider in the packet arrival measurement report only data packets that belong to a specific source and/or destination IP address, source and/or destination MAC address, data stream, or source and/or destination port in the access node.

In an embodiment, the terminal device may request for several types of packet arrival measurement reports, e.g. a separate packet arrival measurement report for each AC. The terminal device may then add to the packet arrival measurement request frame a dialog token identifying the type of the requested packet arrival measurement report. The access node may then add the same dialog token to each packet arrival measurement report that complies with the configuration defined in the packet arrival measurement request frame. In this manner, the terminal device may distinguish different types of packet arrival measurement reports.

Field "Arrival Times Reported" may be used by the terminal device to request the access node to provide arrival timing information of received data packets. As a result, the terminal device acquires reception timing information on data packets addressed to the terminal device and arrived at the access node. The terminal device may use this information to determine the power-save parameters, as described below.

Field "Recommendations present" may be used by the terminal device to request the access node to provide a recommendation for the power-save parameters.

Upon receiving the packet arrival measurement report request frame in step 300, the access node sets up and starts the packet arrival measurements for the terminal device (Step 302). The access node may determine a measurement configuration from the fields comprised in the request, e.g. it may determine that ACs to monitor. It may also determine the transmission parameters for the packet arrival measurement reports. It may also determine whether or not the requested configuration can be realized. Upon determining whether or not to set up the measurements, the access node may transmit a packet arrival measurement response frame to the terminal device (step 304). The packet arrival measurement response frame may comprise an information element comprising the following information on the success of the packet arrival measurement setup.

TABLE 5

| Value | Description |
| --- | --- |
| 00 | Success |
| 01 | Option not supported |
| 10 | Non-specified error |
| 11 | Measurement temporary not available |

Let us now assume that the packet arrival measurement setup was completed successfully and that the acknowledgement in step 304 indicates to the terminal device the successful completion of the setup and the activation of the packet arrival measurements in the access node. As a consequence, the packet arrival and measurement setup has been completed and the access node may start to measure the packet arrivals for data packets addressed to the terminal device and report the measurement to the terminal device. The terminal device may determine its power-save parameters on the basis of the packet arrival measurement reports.

In step 306, the access node receives data packets addressed to the terminal device from a network, e.g. the Internet. The access node may determine and store reception timings of each received data packet or, equivalently, start a timer upon reception of each data packet. The reception timing or the counter may be used to determine the duration the access node buffers the data packet before it is transmitted to the terminal device. In another embodiment, the access node monitors the number of buffered data packets. In general, the access node may measure arrival and/or transmission statistics of the data packets addressed to the terminal device. If the terminal device has requested the access node to provide a recommendation for the power-save parameters, the access node may determine the power-save parameters for the terminal device. The recommendation for the power-save parameters may comprise timing for the power-save mode of the terminal device. The access node may determine the recommended timing on the basis of traffic between the access node and other terminal devices and/or access nodes, channel reservation schemes, arrival rate of data packets addressed to the terminal device, etc. Accordingly, the access node may propose the timing of the power-save mode of the terminal device according to the current operational conditions of the access node. The timing may be defined by a periodicity and/or offset of a start time of the power-save mode of the terminal device and/or a triggering interval of the terminal device. The triggering interval may refer to an interval between consecutive transmissions of a triggering frame from the terminal device to start the service period.

In block 308, transmission of the packet arrival measurement report is triggered in the access node. Depending on the configuration (see Table 3), a triggering event may be reception of a packet arrival request frame from the terminal device or a determined timing. This causes the access node to retrieve packet arrival statistics for the received data packets and to prepare the packet arrival measurement report which complies with the configuration requested by the terminal device. The packet arrival measurement report may comprise at least one of statistics on the packet arrivals and power-save parameter recommendations for the terminal device. Table 6 shows an embodiment of the contents of the packet arrival measurement report.

TABLE 6

| Type | Length | Number of Buffered Packets | Shortest Buffering Time | Longest Buffering Time | Average Buffering Time | Rec. Options | Rec. Offset | Rec. Triggering Interval |
| --- | --- | --- | --- | --- | --- | --- | --- | --- |
| 1 oct | 1 oct | 1 oct | 1 oct | 1 oct | 1 oct | 1 oct | 1 oct | 1 oct |

The Type field (1 octet) may be set to unique value of the packet arrival measurement report frame. The Length field (1 octet) may contain the length of the frame payload in octets and it may be set to value 2, 4 or 6 in this example. The length is two octets, when only the fields "Recommended Offset" and "Recommended Triggering Interval" are present, 4 when statistics of the buffered frames are present, and 6 when all information fields are present.

Field "Number of Buffered packets" may indicate the number of data packets that have been buffered since the previous transmission of the packet arrival measurement report. If a frame is transmitted without buffering, the incrementation of the number of buffered frames may be omitted. The transmission of the packet arrival measurement report may reset a counter counting the number of buffered packets to zero.

Field "Shortest Buffering Time" may be an unsigned integer that indicates the shortest time that a data packet has been buffered in units of time units, wherein a time unit may be 1.024 ms. The buffering time may be measured from the reception time of the data packet to the time the frame is output to a MAC layer for transmission in the access node. Typically, the frame is given to the MAC layer for transmission when the trigger frame is received in the access node.

Field "Longest Buffering Time" may be an unsigned integer that indicates the longest time that a data packet has been buffered in units of the time units. The buffering time may be measured from the reception time of the data packet to the time the frame is output to a MAC layer for transmission in the access node.

Field "Average Buffering Time" may be an unsigned integer that indicates an average time that frames have been buffered in units of the time units.

The reported buffering times may also be restricted to indicate the buffering times since the previous transmission of the packet arrival measurement report.

In an embodiment, the packet arrival measurement report further comprises a time stamp field which comprises a time stamp indicating timing of the reported measurements. Sometimes, the transmission of the packet arrival measurement report may be delayed because of channel congestion, for example, so the time stamp field enables the terminal device to determine the actual timing of the reported measurements.

As another embodiment of the buffering time indication, the buffering time for each buffered frame may be indicated in a separate one-octet field, indicating the buffering time in time units and listed in the frame arrival order, for example, or in another order. Table 7 illustrates an example of the field used in this embodiment instead of the buffering time fields of Table 6. The Length field may be modified according to the number of reported frames.

TABLE 7

| Number of Buffered Packets | Delay Value of Packet 1 | ... | Delay Value of Packet N |
| --- | --- | --- | --- |
| 1 octet | 1 octet | ... | 1 octet |

The embodiment of Table 7 provides the terminal device with "raw measurement data" while the embodiment where the access node computes the buffering time statistics provides the terminal device with refined measurement data.

Field "Recommendation Options" may comprise recommended power-save parameters of the terminal device.

The "Recommendation Options" may provide reasoning for the recommendations. The access node may have recommended a transmission time for the triggering frame during which there is typically only a little amount of high-access-category traffic, or any traffic. During this time, the terminal device may transmit its traffic, including the triggering frame, with a shorter access delay which lowers the power consumption of the terminal device.

The "Recommendation Options" may provide reasoning that the access node has recommended the time instant to lower the transmission delays of the traffic.

Field "Recommended Offset" may be an unsigned integer in units of time units that indicates a time offset, measured from a determined time reference, for use by the terminal device to transmit the trigger frame. The determined time reference may be a target beacon transmission time (TBTT), for example.

The Recommended Trigger Interval field is an unsigned integer in units of TUs that indicates an interval between consecutive trigger frame transmissions.

It should be appreciated that other embodiments may use different statistics for the packet arrivals. For example, if the packets arrive periodically at the access node, the access node may report measured periodicity of the packet arrivals. The access node may also determine a packet arrival pattern, e.g. whether the traffic is periodic or bursty, and indicate the packet arrival pattern in the report. The determination that the packet arrival pattern is periodic may be made by determining that the packet arrivals are detected to occur with a substantially constant periodicity. A tolerance zone may be provided to the periodicity, as the networks tend to add random delay to the periodic traffic. The determination that the packet arrival pattern is bursty may be made by determining that at least a determined number of data packets are detected to arrive within a determined time period. In another, more detailed scheme it may be determined that there exist time periods when at least the determined number of data packets are received and time periods when a substantially lower number of data packets are received.

In step 310, the access node transmits the packet arrival measurement report to the terminal device and the terminal device receives the packet arrival measurement report. In block 312, the terminal device determines the power-save parameters on the basis of the received packet arrival measurement report. If the report comprises the recommendations, the terminal device may apply the recommended options. If no recommendations are available, the terminal device may compute the power-save parameters from the statistics or measurement data comprised in the report.

In step 314, the terminal device may detect that the access node has one or more data packets stored for the terminal device and, as a consequence, the terminal device may trigger the downlink transmission of the data packets from the access node to the terminal device. The data packets may be transferred in step 314 as well. In step 316, the terminal device enters the power-save mode after receiving the data packets and ending the service period. Meanwhile, the access node may receive further data packets addressed to the terminal device and continues the measurements (block 318). In block 320, the transmission of a next packet arrival measurement report is triggered, and the new report is transmitted from the access node to the terminal device in 324. The terminal device may use the new report to adjust the power-save parameters (block 326).

In addition to the contents of the measurement reports, the terminal device may use as an input to the (re)configuration of the power-save parameters downlink performance monitored in connection with transfer of data packets between the access node and the terminal device (block 322). The terminal device may monitor how the changes in the power-save parameters affect the downlink performance and determine further changes to the power-save parameters on that basis. The terminal device may attempt to find a balance between low transmission delays (in terms of short buffering times in the access node, for example) and power saving and attempt to find power-saving parameters that provide a solution that provides the best performance.

In an embodiment, the terminal device uses the packet arrival measurements in addition to other type of packet arrival measurements. The terminal device may combine the packet arrival measurements with previous measurements acquired over a determined application level operation. The application level operation may comprise update of e-mail, uniform resource locator (URL) redirection (user entering an URL on a browser), etc. The terminal device may store a data packet transmission profile of the application level operation, e.g. data packet transmission timings between the access node and the terminal device and/or packet arrival timings of data packets addressed to the terminal device at the access node. The terminal device may then use this data packet transmission profile to configure the power-save parameters for the next same application level operation. The terminal device may use the previous power-save parameters as a template and adjust the power-save parameters during the data transfer on the basis of the received packet arrival measurement reports. In this manner, the packet arrival measurements may complement the packet transmission profile and improve the performance of the terminal device.

Figure 4:
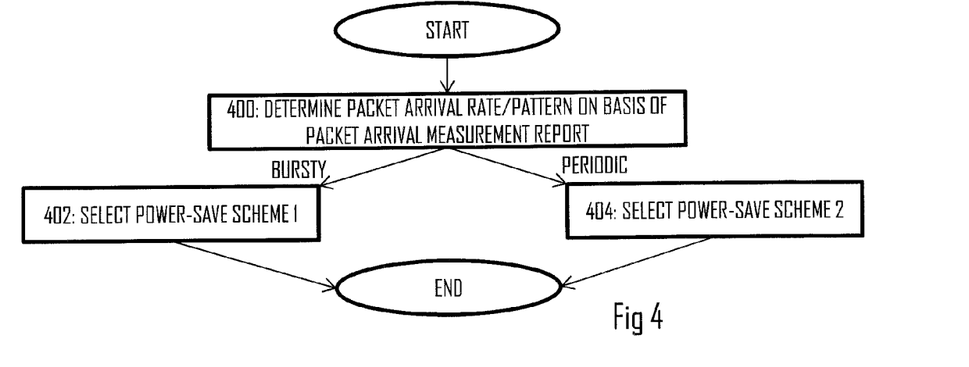
FIG. 4 illustrates a flow diagram of a process for determining a packet arrival pattern and selecting at least one power-save parameter according to an embodiment of the invention.

In an embodiment, the terminal device determines the packet arrival pattern and chooses a power-save scheme on the basis of the determined packet arrival pattern. The packet arrival pattern may be indicated in the packet arrival measurement report, as described above, or the terminal device may compute it from the packet arrival statistics comprised in the packet arrival measurement report. Let us refer to a flow diagram of FIG. 4 illustrating a process where the terminal device determines whether the packet arrival pattern is periodic or bursty in block 400. The periodicity or the burstiness of the traffic may be determined directly from the embodiment of Table 7 by using the principles described above. The embodiment of Table 6 may also provide sufficient information to detect the packet arrival pattern. For example, if the number of buffered packets is high and the shortest and the longest buffering times are relatively close to each other, the terminal device may determine that the traffic is bursty. Variability in the reported measurement data may also serve as an indicator of the burstiness of the traffic. On the other hand, if the number of buffered frames remains sufficiently constant over multiple packet arrival measurement reports, and the other reported measurement data is also relatively constant, the terminal device may determine that the traffic is periodic. The terminal device may employ different power-save schemes for different packet arrival patterns. Referring to FIG. 4, if the packet arrival pattern is determined to be bursty, the process may proceed to block 402 in which the terminal device applies a first power-save scheme. On the other hand, if the packet arrival pattern is determined to be periodic, the process may proceed to block 404 in which the terminal device applies a second power-save scheme.

The packet arrival measurement report thus comprises measured arrival statistics of data packets that have arrived at the access node, and the terminal device determines a future arrival rate of the data packets at the access node on the basis of said measured arrival statistics. This enables the terminal device to determine the power-save periods and/or other power-save parameters accordingly.

In another embodiment where the access node determines the packet arrival pattern and includes the packet arrival pattern into the packet arrival measurement report, the terminal device may determine the packet arrival pattern from the information element of the packet arrival measurement report that explicitly defines the packet arrival pattern.

Figure 5:
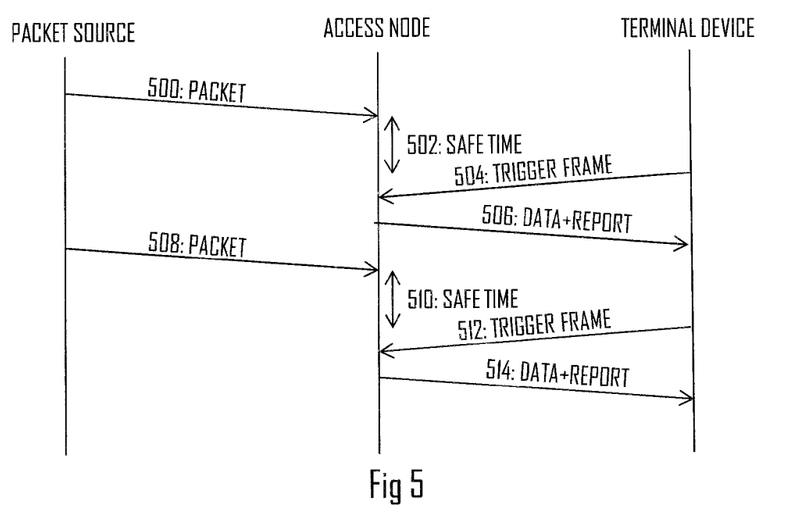
FIGS. 5 and 6 illustrate power-save timings for different packet arrival patterns according to some embodiments of the invention.
Figure 6:
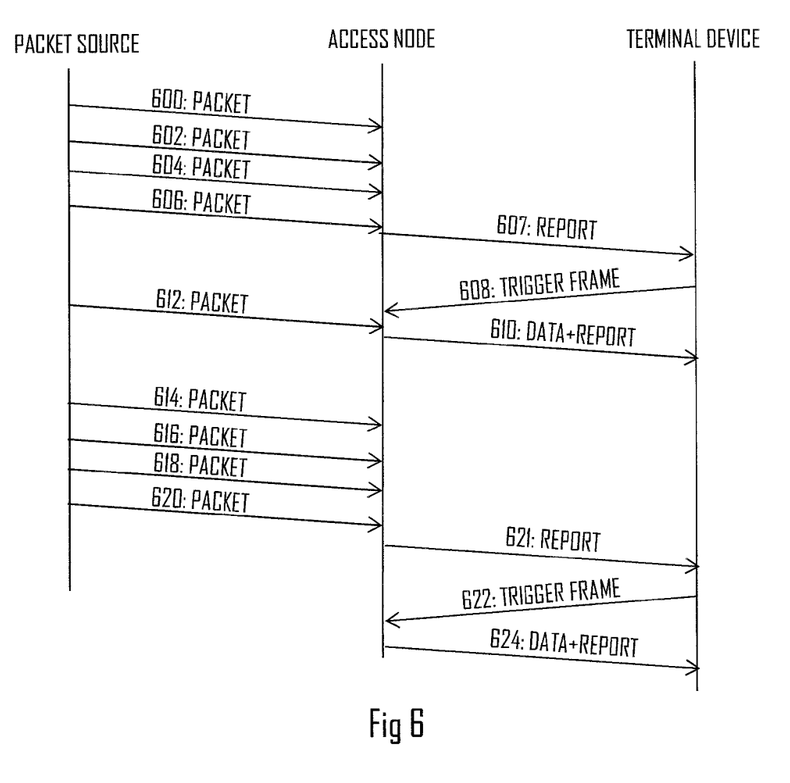

FIGS. 5 and 6 illustrate different power-save schemes for the periodic and bursty packet arrival patterns. The terminal device may determine a triggering time that matches with the estimated packet arrivals such that the transmission and buffering delays may be minimized.

Let us first consider the periodic traffic with reference to FIG. 5. Real time application data packets may represent data transmitted with a constant periodicity, e.g. 20 ms periodicity. The terminal device may then estimate the packet arrival timings from the buffering time(s) comprised in the packet arrival measurement report(s) and add a safe time (e.g. 1 to 2 ms) to the estimates to account for processing delays etc. and to make sure that the data packet will be ready for transmission. With reference to FIG. 5, the access node receives a data packet addressed to the terminal device in step 500 and the terminal device may have estimated the arrival time on the basis of the packet arrival pattern determined from the previous packet arrival measurement report(s). The terminal device adds the safe time to the estimated packet arrival time (step 502) and, after the expiration of the safe time, triggers downlink transmission of the data packet by transmitting the triggering frame to the access node in step 504. In response to the triggering frame, the access node may start the service period of the terminal device and transmit the data packet and, optionally, a new packet arrival measurement report, to the terminal device (step 506). After the service period, the terminal device may enter a power-save mode until the timing of the transmission of a subsequent trigger frame. The terminal device may determine the contents of the packet arrival measurement reports and determine whether or not there has been a change in the packet arrival pattern that causes a change in the power-save parameters, e.g. the power-save mode timing. In step 508, the access node receives a subsequent data packet and, after the safe time in 510, the terminal device wakes from the power-save mode and triggers a new service period in 512 and receives the data packet in 514.

Let us then consider the bursty traffic with reference to FIG. 6. TCP traffic is an example of bursty traffic. If the terminal device detects an arrival of a burst of data packets on the basis of the received packet arrival measurement report, the terminal device may schedule the service period to be triggered after the burst or at the end of the burst so that the additional delay of the transmission may be avoided. In this manner, the terminal device may use packet aggregation to transmit multiple data frames during a single service period and to use the power-save mode between the bursts. Referring to FIG. 6, the access node receives a burst of data packets from a packet source, e.g. network server, in steps 600, 602, 604, 606. In 607, the access node transmits a packet arrival measurement report comprising measurement data related to the received data packets. In step 608 upon detecting the burst, the terminal device may trigger the service period, and the data packets are transferred to the terminal device in 610, optionally together with a new packet arrival measurement report reporting any newly received data packets (612). After the service period, the terminal device may enter the power-save mode until the timing of the subsequent measurement report 621. Meanwhile, the access node may have received a new burst of data packets in 614, 616, 618, 620, and these may be reported in 621, thus triggering a new service period 622, 624. If the packet arrival measurement report does not indicate a burst of data packets, e.g. the report in 610, the terminal device may choose not to trigger the service period for a single data packet or a few data packets. The terminal device may define a minimum number of buffered data packets that trigger the service period. In connection with bursty traffic, the end-to-end delay may not be critical and, therefore, the terminal device may consider the efficiency of the air interface and use the packet aggregation, when possible.

Figure 7:
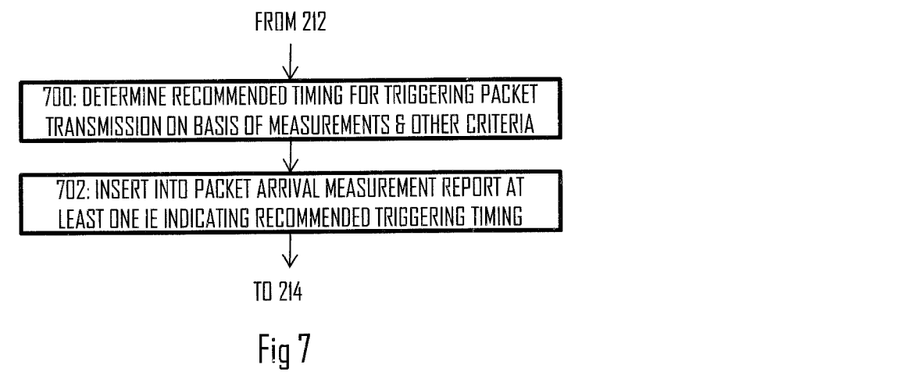
FIG. 7 illustrates a flow diagram for determining recommendations for power-save parameters of a terminal device by an access node according to an embodiment of the invention.

As described above, the access node may determine recommendations or commands for the power-save parameters of the terminal device upon request from the terminal device. FIG. 7 illustrates a flow diagram of a procedure for making the recommendations in the access node. The process may belong to the process of FIG. 2B, as shown in FIG. 7. In block 700, the access node may estimate a future packet arrival rate and/or timing on the basis of the measured information on arrival of at least one data packet addressed to the terminal device at the access node. The access node may then choose transmission timing for the triggering packet on the basis of the estimated future packet arrival rate/timing. The access node may consider other criteria as well, e.g. triggering timings of other terminal devices, channel congestion, and periodic channel reservations of the access node and/or the other terminal devices. Upon determining the recommended power-save parameters, the access node may insert the recommendations into the next packet arrival measurement report in block 702 and transmit the packet arrival measurement report to the terminal device.

Figure 8:
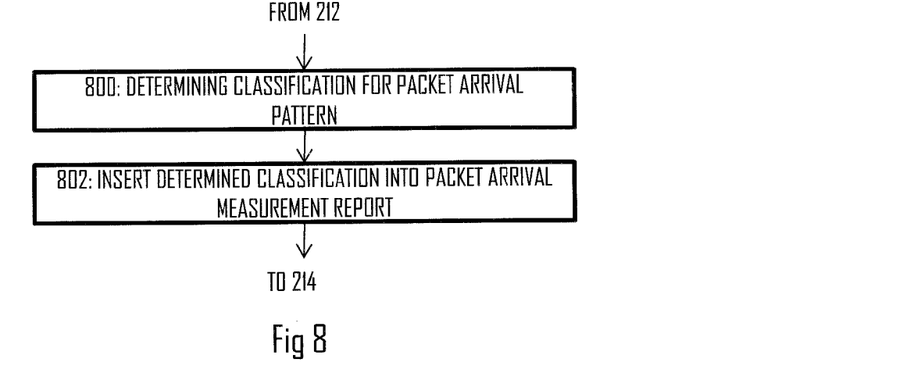
FIG. 8 illustrates a flow diagram for determining the packet arrival pattern at the access node according to an embodiment of the invention.

As described above, the access node may determine the packet arrival pattern and insert the determined packet arrival pattern into the packet arrival measurement report. FIG. 8 illustrates a flow diagram of a procedure for reporting the packet arrival pattern. The process may belong to the process of FIG. 2B, as shown in FIG. 7. In block 800, the access node determines a classification for the packet arrival pattern. In an embodiment, the classification comprises at least one of periodic, constant rate, and bursty pattern classifications. In block 802, the access node inserts the determined packet arrival pattern classification into the packet arrival measurement report in order to provide the terminal device with the determined classification.

Figure 9:
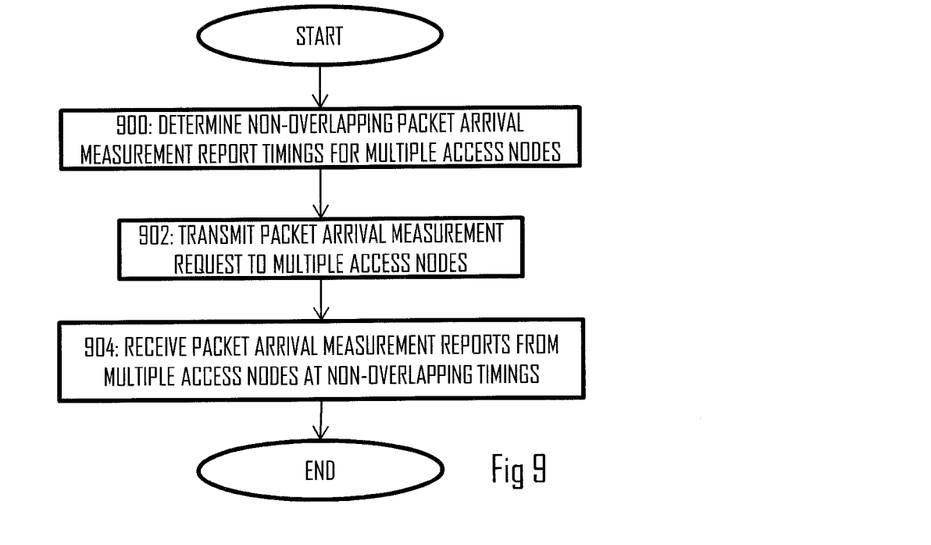
FIG. 9 illustrates a flow diagram for multipath operation in the terminal device according to an embodiment of the invention.

As described above, the terminal device may employ a multipath connection through multiple access nodes. The terminal device may configure the packet arrival measurements concurrently with the multiple access nodes. The terminal device may transmit separate packet arrival measurement requests to different access nodes with which the terminal device has associated for concurrent operation, e.g. the multipath operation. The terminal device may align the transmission of the packet arrival measurement reports between the multiple access nodes. For example, if the access nodes operate on different channels, the terminal device may configure the transmission of the packet arrival measurement reports to occur at non-overlapping transmission timings. This may be carried out by specifying non-overlapping transmission timings in the request or by configuring the transmission of the packet arrival measurement report upon a specific request from the terminal device. Referring to a flow diagram of such a procedure in FIG. 9, the terminal device may determine the non-overlapping packet arrival measurement report timings for the multiple access nodes in block 900. In block 902, the terminal device transmits a packet arrival measurement request to the multiple access nodes. In block 904, the terminal device receives packet arrival measurement reports from the access nodes at non-overlapping timings. In this manner, the terminal device is able to reduce the probability that it misses one or more packet arrival measurement reports. The terminal device may then schedule power-save timings to time intervals when there is no scheduled packet arrival measurement transmission and/or estimated data packet transmissions.

The terminal device may select different packet arrival measurement report intervals to different access nodes. For example, if one of the access nodes is determined to provide a better connection in terms of channel quality and/or quality of the backbone link, the terminal device may prioritize such an access node and configure the prioritized access node to transmit the packet arrival measurement reports more frequently than other access nodes.

Figure 10:
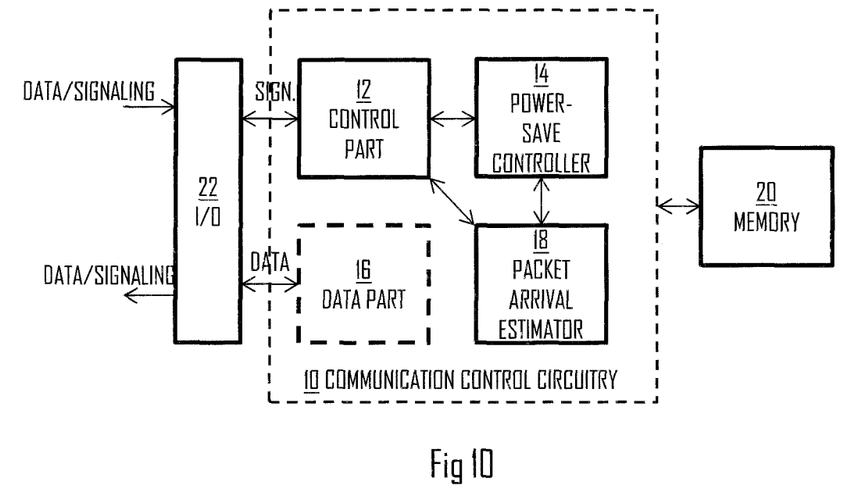
FIGS. 10 and 11 illustrate block diagrams of apparatuses according to some embodiments of the invention.

FIG. 10 illustrates an embodiment of an apparatus comprising means for carrying out the above-mentioned functionalities of the terminal device. The terminal device may comply with specifications of an IEEE 802.11 network or another wireless network, e.g. it may be a STA. The terminal device may also be a cognitive radio apparatus capable of adapting its operation to a changing radio environment, e.g. to changes in parameters of another system on the same frequency band. The terminal device may be or may be comprised in a computer (PC), a laptop, a tablet computer, a cellular phone, a palm computer, or any other wireless apparatus provided with radio communication capability. In another embodiment, the apparatus carrying out the above-described functionalities of the terminal device is comprised in such a wireless apparatus, e.g. the apparatus may comprise a circuitry, e.g. a chip, a processor, a micro controller, or a combination of such circuitries in the wireless apparatus.

Referring to FIG. 10, the apparatus may comprise a communication controller circuitry 10 configured to control wireless communications in the wireless device. The communication controller circuitry 10 may configure the establishment and the configuration of the packet arrival measurement setup, as described above. The communication controller circuitry 10 may comprise a control part 12 handling control signalling communication with respect to transmission, reception, and extraction of control or management frames including the packet arrival measurement requests, the packet arrival measurement reports, or any other frames transmitted in the wireless network, as described above. The communication controller circuitry 10 may further comprise a data part 16 that handles transmission and reception of payload data when the terminal device is associated to an access node or to another wireless device. The communication control circuitry 10 may further comprise a packet arrival estimator circuitry 18 configured to estimate future packet arrivals on the basis of the currently received packet arrival measurement data related to data packets that have already arrived at the access node. The packet arrival estimator may determine the packet arrival pattern, for example. The communication controller circuitry 10 may further comprise a power-save controller circuitry 14 configured to determine power-save parameters, e.g. power-save timings defined by at least some of a power-save start time, power-save end time, power-save periodicity, and power-save interval. The power-save controller may determine the power-save parameters on the basis of the configured transmission of the packet arrival measurement reports from the access node(s) and the estimated packet arrivals at the access node(s) plus the safe time.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) configuring the apparatus to perform the above-described functionalities of the terminal device. The memory 20 may also store communication parameters and other information needed for the wireless communications, e.g. power-save schemes for different packet arrival patterns. The apparatus may further comprise radio interface components 22 providing the apparatus with radio communication capabilities within one or more wireless networks. The radio interface components 22 may comprise standard well-known components such as an amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the terminal device comprises at least one processor and at least one memory including a computer program code, wherein the at least one memory and the computer program code are configured, with the at least one processor, to cause the apparatus to carry out the functionalities of the terminal device according to any one of the embodiments of FIGS. 2A, 3 to 6 and 9. Accordingly, the at least one processor, the memory, and the computer program code form processing means for carrying out embodiments of the present invention in the terminal device.

Figure 11:
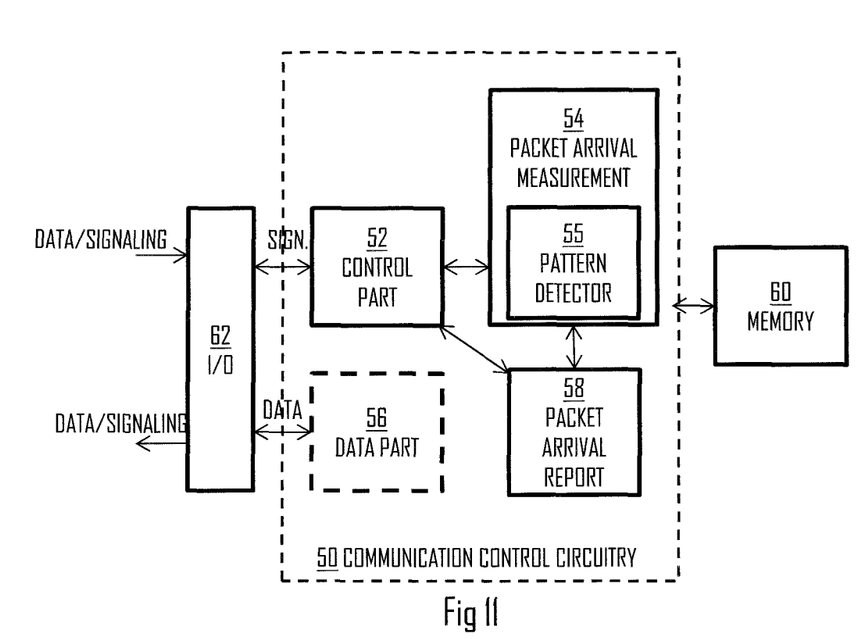

FIG. 11 illustrates an embodiment of an apparatus comprising means for carrying out the above-mentioned functionalities of the access node. The access node may be a wireless apparatus which complies with specifications of an IEEE 802.11 network or another wireless network. The wireless apparatus may also be a cognitive radio apparatus capable of adapting its operation to a changing radio environment, e.g. to changes in parameters of another system on the same frequency band. The wireless device may be or may be comprised in a computer (PC), a laptop, a tablet computer, a cellular phone, a palm computer, a base station with routing functionalities, or any other apparatus provided with radio communication capability. In another embodiment, the apparatus carrying out the above-described functionalities of the access node is comprised in such a wireless apparatus, e.g. the apparatus may comprise a circuitry, e.g. a chip, a processor, a micro controller, or a combination of such circuitries in the wireless device.

Referring to FIG. 11, the apparatus may comprise a communication controller circuitry 50 configured to control wireless communications in the wireless apparatus. The communication controller circuitry 50 may comprise a control part 52 handling control signalling communication with respect to transmission, reception, and extraction of control or management frames including the packet arrival measurement requests, the packet arrival measurement reports, or any other frames transmitted in the wireless network, as described above. The communication controller circuitry 50 may further comprise a data part 56 that handles transmission and reception of payload data with devices associated to the wireless apparatus. The communication controller circuitry 50 may further comprise a packet arrival measurement circuitry 54 configured to measure arrival of data packets addressed to another wireless apparatus that has requested for packet arrival measurements from the wireless apparatus. The packet arrival measurement circuitry 54 may be configured to measure reception timing of the data packets received from a packet source, and it may measure buffering times of the received data packets. The packet arrival measurement circuitry may compute various statistics related to the received data packets, as described above. The packet arrival measurement circuitry may comprise a packet arrival pattern detector circuitry 55 configured to detect patterns in the arrival of the received data packets.

Depending on the embodiment, the packet arrival pattern detector circuitry 55 may focus the pattern detection to data packets of a determined stream, IP address, MAC address, or application port, for example, or it may determine the pattern jointly for all data packets addressed to the other wireless apparatus. The packet arrival measurements and, optionally, the determined pattern may be output to a packet arrival reporting circuitry 58 configured to prepare the packet arrival measurement reports according to the requests provided by the other wireless apparatus. The packet arrival reporting circuitry 58 may insert into the packet arrival measurement report requested information, e.g. the measurement statistics, recommended power-save parameters, detected packet arrival pattern, etc. The packet arrival reporting circuitry 58 may then output the packet arrival measurement report to the control part 52 to be transmitted to the other wireless apparatus as a separate frame or to be included in another frame transmitted to the other wireless apparatus.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise the memory 60 that stores computer programs (software) configuring the apparatus to perform the above-described functionalities of the wireless apparatus, e.g. the access node. The memory 60 may also store communication parameters and other information needed for the wireless communications within a wireless network of the access point and with other wireless networks. The memory 60 may store the measurement statistics, rules for determining the packet arrival patterns, rules for mapping the measurement statistics and, optionally, other criteria to recommended power-save parameters, etc. The apparatus may further comprise radio interface components 62 providing the apparatus with radio communication capabilities within its wireless network and/or with other wireless networks. The radio interface components 62 may comprise standard well-known components such as an amplifier, filter, frequency-converter, (de)modulator, and encoder/decoder circuitries and one or more antennas. The apparatus may further comprise a user interface enabling interaction with the user of the device. The user interface may comprise a display, a keypad or a keyboard, a loud-speaker, etc.

In an embodiment, the apparatus carrying out the embodiments of the invention in the wireless apparatus comprises at least one processor and at least one memory including a computer program code, wherein the at least one memory and the computer program code are configured, with the at least one processor, to cause the apparatus to carry out the functionalities of the access point according to any one of the processes described above with respect to FIGS. 2B, 3 and 5 to 8. Accordingly, the at least one processor, the memory, and the computer program code form processing means for carrying out embodiments of the present invention in the access node.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2A to 8 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless networks defined above but also to other wireless systems. The protocols used, the specifications of systems, their network elements and terminal devices, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   causing, in a first wireless apparatus, transmission of a packet arrival measurement request to a second wireless apparatus;
   receiving, in the first wireless apparatus, a packet arrival measurement report from the second wireless apparatus, wherein the packet arrival measurement report comprises information on arrival of at least one data packet addressed to the first wireless apparatus at the second wireless apparatus; and
   determining, in the first wireless apparatus on the basis of the packet arrival measurement report, a timing of triggering data transfer between the first wireless apparatus and the second wireless apparatus.

2. The method of claim 1, wherein the packet arrival measurement report comprises information on an arrival rate of data packets addressed to the first wireless apparatus at the second wireless apparatus.

3. The method of claim 1, wherein the packet arrival measurement report indicates an interval of periodical packet arrivals.

4. The method of claim 1, wherein the packet arrival measurement request specifies transmission timing for the packet arrival measurement report, the method further comprising determining timing of a power-save mode of the first wireless apparatus on the basis of the transmission timing of the packet arrival measurement report.

5. The method of claim 1, wherein the packet arrival measurement report comprises at least one information element indicating a recommended timing for triggering the data transfer, wherein the at least one information element indicating the recommended timing for triggering the data transfer comprises at least one of a recommended timing offset and a recommended triggering interval.

6. The method of claim 1, wherein the packet arrival measurement report comprises measured arrival statistics of data packets that have arrived at the second wireless apparatus, the method further comprising determining, in the first wireless apparatus, a future arrival rate of the data packets at the second wireless apparatus on the basis of said measured arrival statistics.

7. The method of claim 1, wherein the timing of triggering data transfer comprises a timing of triggering the first wireless apparatus to awake from a power save mode.

8. The method of claim 1, further comprising determining at least one power-saving parameter on the basis of the received packet arrival measurement report by:
   determining periodicity for periodic data packet arrivals at the second wireless apparatus on the basis of said information comprised in the packet arrival measurement report;
   determining the timing of triggering the data transfer to have the determined periodicity; and
   entering a power-save mode between consecutive trigger timings.

9. A method comprising:
   receiving a packet arrival measurement request from a first wireless apparatus in a second wireless apparatus;
   measuring, in the second wireless apparatus, information on arrival of at least one data packet addressed to the first wireless apparatus at the second wireless apparatus;
   causing, in the second wireless apparatus, transmission of a packet arrival measurement report to the first wireless apparatus, wherein the packet arrival measurement report comprises said measured information on the arrival of at least one data packet addressed to the first wireless apparatus at the second wireless apparatus.

10. The method of claim 9, further comprising estimating, in the second wireless apparatus, a future packet arrival rate on the basis of said measured information on arrival of at least one data packet addressed to the first wireless apparatus at the second wireless apparatus.

11. The method of claim 9, further comprising:
   acquiring, from the received packet arrival measurement request transmission control information for the packet arrival measurement report; and
   causing transmission of the packet arrival measurement report according to said transmission control information.

12. An apparatus comprising:
   at least one processor; and
   at least one memory including a computer program code, wherein the at least one memory and the computer program code are configured, with the at least one processor, to cause the apparatus to:
   cause transmission of a packet arrival measurement request to a wireless apparatus;
   acquire a packet arrival measurement report originating from the wireless apparatus, wherein the packet arrival measurement report comprises information on arrival of at least one data packet addressed to the apparatus at the wireless apparatus; and
   determine, on the basis of the packet arrival measurement report, a timing of triggering data transfer between the apparatus and the wireless apparatus.

13. The apparatus of claim 12, wherein the packet arrival measurement report comprises information on an arrival rate of data packets addressed to the apparatus at the wireless apparatus.

14. The apparatus of claim 12, wherein the packet arrival measurement report indicates an interval of periodical packet arrivals.

15. The apparatus of claim 12, wherein the packet arrival measurement request specifies transmission timing for the packet arrival measurement report, and wherein the at least one memory and the computer program code are configured, with the at least one processor, to cause the apparatus to determine timing of a power-save mode of the apparatus on the basis of the transmission timing of the packet arrival measurement report.

16. The apparatus of claim 12, wherein the packet arrival measurement report comprises at least one information element indicating a recommended timing for triggering the data transfer wherein the at least one information element indicating the recommended timing for triggering the data transfer comprises at least one of a recommended timing offset and a recommended triggering interval.

17. The apparatus of claim 12, wherein the packet arrival measurement report comprises measured arrival statistics of data packets that have arrived at the wireless apparatus, and wherein the at least one memory and the computer program code are configured, with the at least one processor, to cause the apparatus to determine a future arrival rate of the data packets at the wireless apparatus on the basis of said measured arrival statistics.

18. The apparatus of claim 12, wherein the timing of triggering data transfer comprises a timing of triggering the apparatus to awake from a power save mode.

19. The apparatus of claim 12, wherein the at least one memory and the computer program code are configured, with the at least one processor, to cause the apparatus to:
   determine periodicity for periodic data packet arrivals at the wireless apparatus on the basis of said information comprised in the packet arrival measurement report;
   determine the timing of triggering the data transfer to have the determined periodicity; and
   enter a power-save mode between consecutive trigger timings.

20. An apparatus comprising:
   at least one processor; and
   at least one memory including a computer program code, wherein the at least one memory and the computer program code are configured, with the at least one processor, to cause the apparatus to:
   acquire a packet arrival measurement request originating from a first wireless apparatus;
   measure information on arrival of at least one data packet addressed to the first wireless apparatus at the apparatus; and
   cause transmission of a packet arrival measurement report to the first wireless apparatus, wherein the packet arrival measurement report comprises said measured information on the arrival of at least one data packet addressed to the first wireless apparatus at the apparatus.

21. The apparatus of claim 20, wherein the at least one memory and the computer program code are configured, with the at least one processor, to cause the apparatus to estimate a future packet arrival rate on the basis of said measured information on arrival of at least one data packet addressed to the first wireless apparatus at the apparatus.

22. The apparatus of claim 20, wherein the at least one memory and the computer program code are configured, with the at least one processor, to cause the apparatus to:
acquire, from the received packet arrival measurement request transmission control information for the packet arrival measurement report; and
cause transmission of the packet arrival measurement report according to said transmission control information.

* * * * *